(No Model.)
G. W. McCANN.
EASEL.
No. 513,195. Patented Jan. 23, 1894.
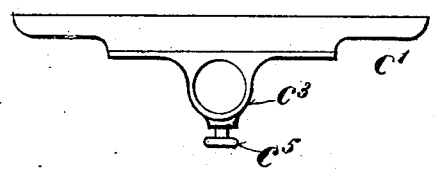
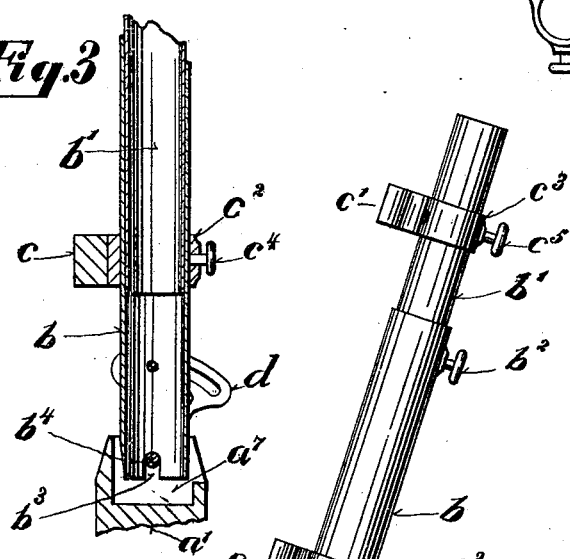
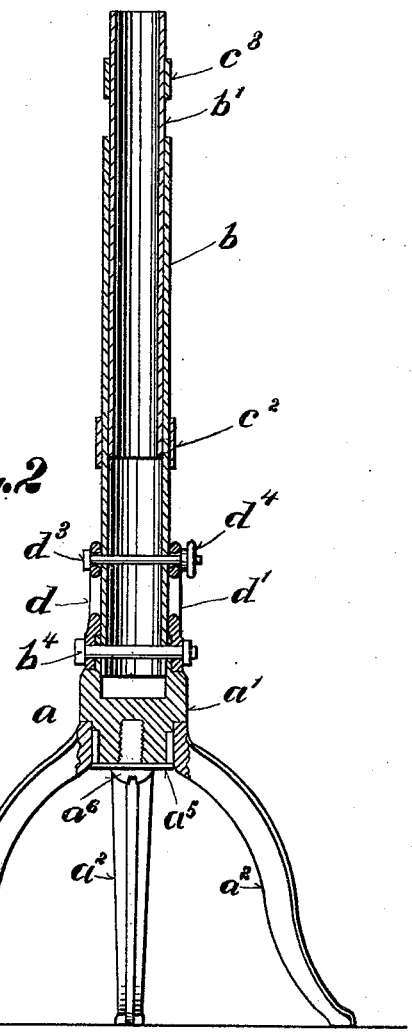
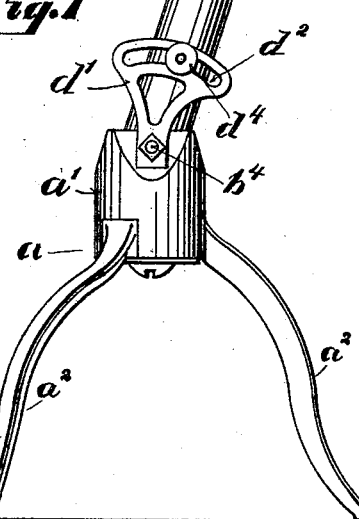
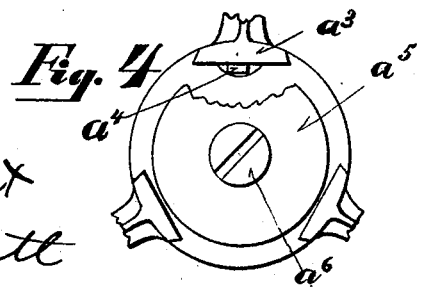
WITNESSES:
Fred Ernest
Frankbatt
INVENTOR
George W. McCann
BY
Shepherd
ATTORNEYS

UNITED STATES PATENT OFFICE.

GEORGE W. McCANN, OF SPRINGFIELD, OHIO.

EASEL.

SPECIFICATION forming part of Letters Patent No. 513,195, dated January 23, 1894.

Application filed May 20, 1893. Serial No. 474,892. (No model.)

*To all whom it may concern:*

Be it known that I, GEORGE W. MCCANN, a citizen of the United States, residing at Springfield, in the county of Clark and State of Ohio, have invented a certain new and useful Improvement in Easels, of which the following is a specification.

My invention relates to improvements in easels; and the object of my invention is to improve upon easels now in use, both as to the mechanical constructions as well as the simplicity of operation.

The invention is especially adapted for the use of artists, for supporting their work, but is also equally applicable for supporting pictures or mirrors in the household, or for display, or for other purposes; the constructions being such that any desired degree of adjustment may be secured.

My invention consists in the various constructions and combinations of parts hereinafter described and pointed out in the claims.

In the accompanying drawings Figure 1 is a side elevation of a device embodying my invention. Fig. 2 is a sectional elevation of the same. Fig. 3 is a detail view also in section, hereinafter referred to. Fig. 4 is a detail view of the bottom of the stand, showing the arrangement for assembling and securing the parts thereof. Fig. 5 is a partial plan view also in detail.

Like parts are represented by similar letters of reference in the several views.

In the said drawings $a$, represents the base, which consists essentially of a supporting block $a'$, having secured thereto legs $a^2$, preferably three in number. This block $a'$, is provided on the outer periphery and near the bottom with dove-tailed recesses into which the legs are adapted to be inserted from the bottom; the said legs being provided with enlarged portions $a^3$, beveled at the sides to fit into said dovetailed recesses, and further provided with projecting lugs or ribs $a^4$, which project beyond the face of the portion $a^3$. As before stated the legs are inserted into the supporting block $a'$, from the bottom, and the weight on the block tends to force the legs firmly into their position; the legs being secured in their position by the engaging portions $a^3$, fitting in the dovetailed slots. In order to further secure the legs against any displacement, I provide on the bottom of the supporting block $a'$, a plate $a^5$, slightly less in diameter than the diameter of the block $a^3$, perforated at the middle and adapted to receive a retaining screw $a^6$, which passes through said plate and screws into the block $a'$. This plate $a^5$, is of sufficient diameter to extend over the engaging lugs $a^4$, on the legs $a^2$, and thus hold said legs firmly in their position.

The supporting portion of the easel consists essentially of a tubular brace or upright $b$, to which is preferably attached a telescoping piece $b'$, also tubular in form and adapted to fit into and slide in the main portion $b$; a set-screw $b^2$, being adapted to hold said telescoping part in any desired position of adjustment with reference to the main portion $b$. The supporting recesses $c$, $c'$, are provided with sleeved portions $c^2$, $c^3$, which fit over the respective parts $b$, $b'$, and are adapted to slide on said parts and be held in any desired position of adjustment by clamping screws $c^4$, $c^5$, which pass through said sleeved portions and impinge against the respective tubular portions $b$, $b'$.

To provide for adjusting the supporting brace or upright $b$, to any desired angular position, I form said upright at the lower end with a slotted opening $b^3$, adapted to fit over and engage a bolt or pin $b^4$, which extends through the top of the supporting block, as hereinafter more fully described. This supporting block $b'$, is provided at its upper end with a pocket $a^7$, into which the end of the upright $b$, is adapted to project. Arranged at each side of the supporting block $a'$, are bracket pieces $d$, $d'$, formed in the nature of a segment and provided with a curved slotted opening $d^2$, near its outer end. These respective brackets $d$, $d'$, are at their lower end let or recessed into the side of the supporting block $a'$, so that the outer surface thereof stands flush with the outer periphery of the bracket, when in place; said brackets being each secured to said supporting piece by the pin or bolt $b^4$ which extends entirely through the respective brackets, and the supporting piece $a^7$, passing through the pocket $a^7$ so as to form a trunnion through the middle of said pocket, and with which the slotted opening $b^3$, of the upright $b$, is adapted to engage. The slotted openings $d^2$, in the respective brackets are formed on the arc of a circle struck from the center of the pin or bolt $b^4$; a clamping bolt $d^3$, being adapted to project through said slotted opening and through the tubular upright $b$, as shown in Fig. 2, and provided with a hand-screw $d^4$, by means of which the parts may be clamped together, so as to hold the upright in any angular position of adjustment within the limits of the slotted openings $d^2$, and about the pin or bolt $b^4$, which serves as a pivot on which the said upright turns.

The supports $c$, $c'$, may be constructed of any desired form to accomplish the purpose. I have shown the respective telescoping parts of the upright formed round, which permits the supports $c$, $c'$, to be adjusted axially with reference to said support, if desired, though it is obvious that any other suitable shape may be employed if found preferable. As thus described it will be seen that I construct an easel, the parts of which may be readily and quickly adjusted to any desired position; the mechanical constructions being such that it may be easily constructed and assembled and as readily taken apart, so as to occupy but small space for storing or shipping. By loosening the screw $a^6$, and removing the plate $a^5$, the legs may be readily removed from the supporting block. By loosening the hand-screw $d^4$, and removing the bolt $d^3$, the upright standard may be readily removed from the supporting block by simply raising the said upright until the slotted opening $b^3$, therein, engages the pivotal pin or bolt $b^4$. It is obvious that the supports $c$, $c'$, may also be readily removed from the respective uprights, so that if desired the easel may be quickly and readily taken apart and re-assembled to suit the preferences and convenience of the user.

Having thus described my invention, I claim—

1. An easel having a supporting block with the detachable legs formed with engaging portions adapted to fit in dovetailed recesses in said supporting block, and the retaining plate adapted to engage with the lugs or projections on said legs, and means for securing the said retaining plate, substantially as specified.

2. The combination with the base having the brackets thereon, each of said brackets being provided with a curved slotted opening, an upright supporting brace arranged between said brackets, said upright being provided with a slotted opening adapted to fit over a bolt or pin which forms a pivot for the same, which pin or bolt is located centrally to the curved slotted openings, an adjustable supporting piece on said upright, substantially as specified.

3. The combination with the base having the supporting block with the pocket formed therein, the detachable bracket pieces secured to said supporting pieces by a bolt or pin which extends through said pocket, each of said brackets being formed with a curved slotted opening on the arc of a circle from said pin, an upright supporting brace having a slotted opening adapted to fit over said pin or bolt, which serves as a pivot therefor, and a clamping bolt extending through said upright piece and through said slotted openings, substantially as specified.

4. The combination with the base having the supporting piece and the detachable legs, said supporting block being provided at the top with a pocket or recess and provided with detachable bracket pieces on each side thereof, a bolt or pin extending through said bracket pieces and through said block, a tubular upright having a telescoping portion therein, said tubular upright being formed with a slotted opening at the bottom adapted to fit over said bolt or pin, and a clamping screw extending through said upright and through said brackets, substantially as specified.

5. The combination with the base and the upright pivotally connected thereto, of the bracket pieces let into recesses in said base, a bolt for connecting said bracket pieces to said base, an upright piece having a slotted opening adapted to fit over said bolt, and means, substantially as described, for clamping said upright pieces in different positions of angular adjustment about said bolt, substantially as specified.

6. The combination with the base having the detachable legs, of the supporting piece, having the detachable brackets, as described, said brackets being let into said supporting piece and secured thereon by a single bolt which extends through said brackets and through the top of said supporting piece, a pocket in said supporting piece, through which said bolt passes, and an upright having a notched end adapted to fit over said bolt, and means, substantially as described, for clamping said upright to said supporting brackets in different positions of angular adjustment, substantially as specified.

GEO. W. McCANN.

In presence of—
W. S. ROEBUCK,
J. W. KILLEN.